United States Patent [19]

Weiler

[11] Patent Number: 4,709,546
[45] Date of Patent: Dec. 1, 1987

[54] COOLED GAS TURBINE OPERABLE WITH A CONTROLLED COOLING AIR QUANTITY

[75] Inventor: Wolfgang Weiler, Dachau, Fed. Rep. of Germany

[73] Assignee: MTU Motoren-und Turbinen-Union GmbH, Munich, Fed. Rep. of Germany

[21] Appl. No.: 853,477

[22] Filed: Apr. 18, 1986

[30] Foreign Application Priority Data

Apr. 20, 1985 [DE] Fed. Rep. of Germany ....... 3514354

[51] Int. Cl.⁴ ............................. F02C 7/12; F02C 9/16
[52] U.S. Cl. .................................... 60/39.29; 415/116
[58] Field of Search ................. 60/39.07, 39.27, 39.29; 415/115, 116, 117

[56] References Cited

U.S. PATENT DOCUMENTS

| | | | |
|---|---|---|---|
| 2,811,833 | 11/1957 | Broffitt | 60/39.66 |
| 3,361,348 | 1/1968 | Salerno | |
| 3,584,458 | 6/1971 | Wetzler | 60/39.02 |
| 3,869,221 | 3/1975 | Wildner | |
| 4,173,120 | 11/1979 | Grosjean et al. | 415/115 |
| 4,296,599 | 10/1981 | Adamson | 415/115 |
| 4,304,093 | 12/1981 | Schulze | 60/39.29 |
| 4,403,912 | 9/1983 | Pekari et al. | |
| 4,416,111 | 11/1983 | Lenahan et al. | 60/39.29 |
| 4,462,204 | 7/1984 | Hull | 60/39.07 |

FOREIGN PATENT DOCUMENTS

| | | |
|---|---|---|
| 1080818 | 4/1960 | Fed. Rep. of Germany . |
| 3228678 | 2/1983 | Fed. Rep. of Germany . |
| 2015085 | 9/1979 | United Kingdom . |

Primary Examiner—Louis J. Casaregola
Attorney, Agent, or Firm—W. G. Fasse; D. H. Kane, Jr.

[57] ABSTRACT

A cooled gas turbine power plant has a compressor and a high pressure turbine connected to the compressor. The cooling air quantity for the turbine is controlled in response to instantaneous load conditions and in direct response to the cooling air quantity control of the compressor. This control of the cooling air quantity for the turbine is achieved by a direct mechanical coupling of a slide valve for the turbine cooling air control with the control of the compressor, whereby good power output values and low fuel consumption values are achieved for the high pressure turbine, especially under partial load operating conditions. The compressor may be controlled by an adjustment of the angular position of its guide vanes or blades or by an adjustment of the quantity of its discharge air.

8 Claims, 5 Drawing Figures

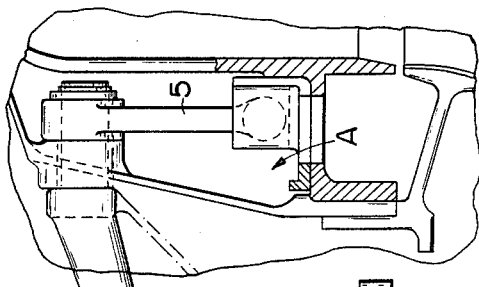
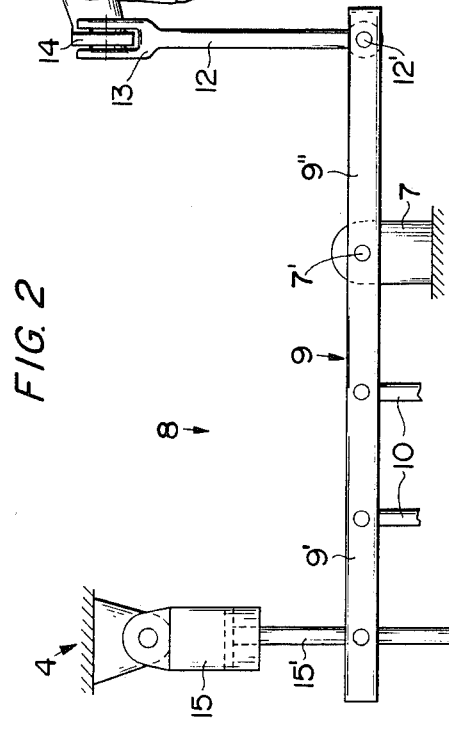
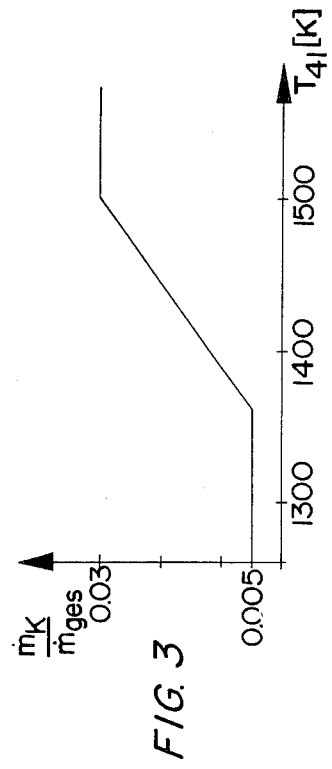
FIG. 2
FIG. 3

COOLED GAS TURBINE OPERABLE WITH A CONTROLLED COOLING AIR QUANTITY

FIELD OF THE INVENTION

The invention relates to cooled gas turbines which are operable with a controlled cooling air quantity. More specifically, the cooling air quantity is controlled in a closed loop manner, in response to the load requirements. Such a turbine is normally equipped with a compressor which in turn is controlled in a closed loop manner either by guide vanes or by its working or blowing off air quantity. The high pressure turbine is arranged downstream of the compressor.

DESCRIPTION OF THE PRIOR ART

Gas turbines operating with highly efficient cyclic processes are characterized by high compression ratios, high turbine entry temperatures, low internal losses, low leakage, and low heat quantities transported internally through the structure. On the one hand, the compression ratio in the compressor determines primarily the specific fuel consumption of the engine. On the other hand, the turbine entry temperature is the primary influence for the specific power output and thus for the weight and the external dimensions of the gas turbine and of the component parts of the turbine equipment such as supply and discharge air conduits.

When the turbine entry temperature exceeds certain limit values, it becomes necessary to cool certain structural components of the turbine. These temperature limit values correspond approximately to 1300° K. for presently available nickel based alloys solidified in a polycrystalline manner. It is expected that in the near future this temperature limit can be pushed upwardly to about 1380° to 1400° K. when certain alloy types will become available at reasonable costs. Such alloy types solidify in a rectified manner, or they solidify as single crystals, or such alloy types are hardened by employing oxide dispersion.

The cooling of structural components in gas turbines takes place substantially exclusively with the aid of air which generally is withdrawn from the cyclic process downstream of the compressor. Thus, this air is substantially lost for producing power in the turbine, whereby the power data of the engine are influenced negatively. Even small savings in cooling air would result in substantial improvements. For example, in a modern gas turbine of the 1000 kw class, having a total air throughput of about 3.6 kg/sec., a compression ratio of about 13, and a turbine entry temperature of about 1500° K., a saving of 1% of the total cooling air normally needed, improves the specific fuel consumption by 0.9% while simultaneously increasing the specific power output by 1.9%. Typical cooling air consumption quantities of gas turbines, of the above mentioned power class, correspond to about 1.5 to 2% of the total air throughput in the case of single stage high pressure turbines, whereas in the case of two stage high pressure turbines, the cooling air percentage is 3 to 5% of the total air throughput. These power and fuel consumption disadvantages must, so far, be accepted even at all partial load points along the operating characteristic even though due to the relationship between the power output and the temperature, cooling, for example of the high pressure turbine vanes, would not be necessary any more at these partial loads.

OBJECTS OF THE INVENTION

In view of the foregoing it is the aim of the invention to achieve the following objects singly or in combination:

to provide a cooled gas turbine with a load responsive closed loop control of the cooling air quantity for improving the fuel consumption of such turbines;

to combine the control of the compressor with the control of the cooling air supply to the turbine;

to use the control means of the compressor also for the load responsive control of the cooling air supply for the turbine;

to keep the turbine components at a constant operating temperature under all load conditions for improving the thermal life span of such turbines; and to adapt the supplied quantity of cooling air to the needed quantity of cooling air under the particular load conditions.

SUMMARY OF THE INVENTION

The above objectives have been achieved according to the invention in a turbine power plant in which the volume control of the cooling air for the high pressure turbine is responsive to the control of the compressor upstream of the high pressure turbine. This responsiveness of the volume control member for the turbine cooling air to the control of the compressor is accomplished by directly and mechanically coupling the cooling air volume control member with the control means of the compressor. The control means of the compressor may comprise adjustment devices for adjusting the angular position of the guide blades in the compressor or they may comprise means for controlling the discharge air volume of the compressor.

The volume control member for the turbine cooling air is preferably a rotary slide valve located at an inlet end of the high pressure turbine. The rotary slide valve is operated through a control linkage which in turn is operated by the compressor control means.

In connection with a gas turbine power plant having a compressor with controlled guide blades or vanes, the control linkage which connects the rotary slide valve to the control means of the compressor guide vanes or blades comprises, preferably, a rocker lever including a first arm connected to the compressor control means and a second arm connected to the rotary slide valve. More specifically, the first arm is thus linked to at least several of the adjustable guide vanes of the compressor which guide vanes are adjusted for controlling the stagger angle in a certain r.p.m. range in a continuous manner and in response to the compressor r.p.m.

Thus, according to the invention the control members which are present anyway in a compressor of medium to higher compression ratios, are utilized for the control of the turbine cooling air volume. These control means are used, for example, in the compressor in the form of air discharge valves or in the form of adjustable guide vanes or blades provided for a certain number of compressor stages. This control of the turbine cooling air volume in response to the control of the compressor is a direct or synchronous control due to the rigid or mechanical coupling between the first control means of the compressor and the second control means of the turbine cooling air volume.

The invention is based on the discovery that the cooling requirements, or rather, the quantity of air needed for efficiently cooling the turbine blades, is subject to the same considerations as the control of the compressor under partial load control conditions. Accordingly, the invention teaches to control or regulate the cooling air quantity in the cooled gas turbine power plant in response to the operating point of the power plant, whereby the cooling air is not withdrawn from the cyclic process downstream of the compressor as is the case according to the prior art, rather, the cooling air of the compressor itself is used for the cooling of the high pressure turbine section of the power plant. Accordingly, this cooling air may be reduced or completely shut off if necessary in connection with partial load points along the operating characteristic of the power plant. This new type of cooling is particularly advantageous in connection with gas turbines for helicopter drives. Such helicopter power plants frequently operate in the low partial load range of the power plant operating characteristic. Distinct improvements in the power data of a system cooled according to the invention have been observed due to the complete or partial shut-off of the cooling air for the blades of the high pressure turbine. These improvements are due to the fact that the quantity of the cooling air for the turbine depends on the actual cooling requirements. More cooling air is supplied for higher cooling requirements and less cooling air or none is supplied for lower cooling requirements.

A gas turbine power plant operated according to the invention has, compared to conventional power plants of this type, a distinct improvement in the specific fuel consumption, especially in the medium and low partial load operating ranges. Another advantage is seen in that the adaptation of the cooling air quantity to the actual requirements through the operating characteristic of the cooling air control valve mechanism increases the power output. Yet, another advantage is seen in that the turbine components to be cooled have a substantially constant temperature. By eliminating a portion of the thermal load cycles, the advantage of an improved thermal lifespan of the relevant turbine components is achieved. Moreover, the respective partial load operating points of the power plant are achieved or maintained at low r.p.m.s of the gas generator, whereby an increased operational life is obtained for all rotating structural components of the gas generator. Still another advantage is seen in the fact that no additional control means, as compared to conventional gas turbines, are necessary because the invention utilizes the control means of the compressor for controlling also the turbine cooling air quantity.

A practical embodiment of a power plant including a high pressure two stage turbine, has been tested while the power plant was operating with a basic cyclic process. The cooling air consumption in the high pressure turbine was 3% of the total air throughput, whereby 2% were used for the first stage and 1% was used for the second stage. The ratio of the cooling air quantity $\dot{m}_K$ to the total throughout quantity $\dot{m}_{ges}$ as a function of the turbine entry temperature will be described in more detail below.

An especially advantageous embodiment of the invention provides for adjusting the zero point of the cooling air quantity control characteristic in response to the turbine entry temperature. A zero point correction member is provided for this purpose. The correction member is responsive to the compressor entry temperature which needs to be measured anyway. Thus, the cooling medium volume control member is responsive, for example, to the adjusted position of the guide vanes or blade of the compressor and simultaneously, the zero point of the cooling medium volume control member is shifted in response to the compressor input temperature. Such a control of the zero point in the characteristic of the turbine cooling air volume control member in response to the compressor entry temperature is possible because the turbine entry temperature has a substantially constant relationship with the compressor entry temperature as will be explained below.

It has been found that controlling the volume control member for the turbine cooling air exclusively in response to the r.p.m. of the compressor is sufficient in most instances of turbine power plants intended for operation on the ground or at relatively small altitudes. Thus, the stated advantages are achieved, for example, for helicopter power plants, for marine and industrial gas turbine power plants without any zero point shifting in the control characteristic of the volume control member for the turbine cooling air. However, the embodiment which employs such zero point shifting takes into account the rating structure of aircraft gas turbines intended for operation at high altitudes. It is characteristic for such rating structures that the turbine entry temperature is limited by the compressor entry temperature which itself is a function of the flight altitude and the flight speed. Normally, the ratio of the turbine entry temperature to the compressor entry temperature is substantially constant for the individual load conditions or ratings, for example, for the starting power, for the maximum cruising power, and the like. Therefore, the turbine entry temperature also is reduced when the environmental temperature and thus the compressor entry temperature falls with an increasing flight altitude. This is taken into account by the above mentioned zero point adjustment in the characteristic of the cooling air volume control member for the turbine. As a result, the temperatures of the structural turbine components forming so-called hot structural sections of the turbine have been reduced. The reduced temperatures in turn require a smaller cooling air quantity needed for maintaining a certain life span for these structural components. It has been found that in certain limited instances it is even possible not to cool at all these structural components under certain operating conditions.

BRIEF DESCRIPTION OF THE DRAWINGS

In order that the invention may be clearly understood, it will now be described, by way of example, with reference to the accompanying drawings, wherein:

FIG. 2 shows the mechanical coupling means in more detail, between the cooling air volume control member and the guide blade position adjustment means of the compressor, whereby the volume control member for the cooling air is located at the end of the compressor and at the inlet of the high pressure turbine;

FIG. 3 is a diagram showing the relationship of the cooling air quantity to the total air throughput quantity as a function of the turbine inlet temperature;

DETAILED DESCRIPTION OF PREFERRED EXAMPLE EMBODIMENTS AND OF THE BEST MODE OF THE INVENTION

Figure 1:
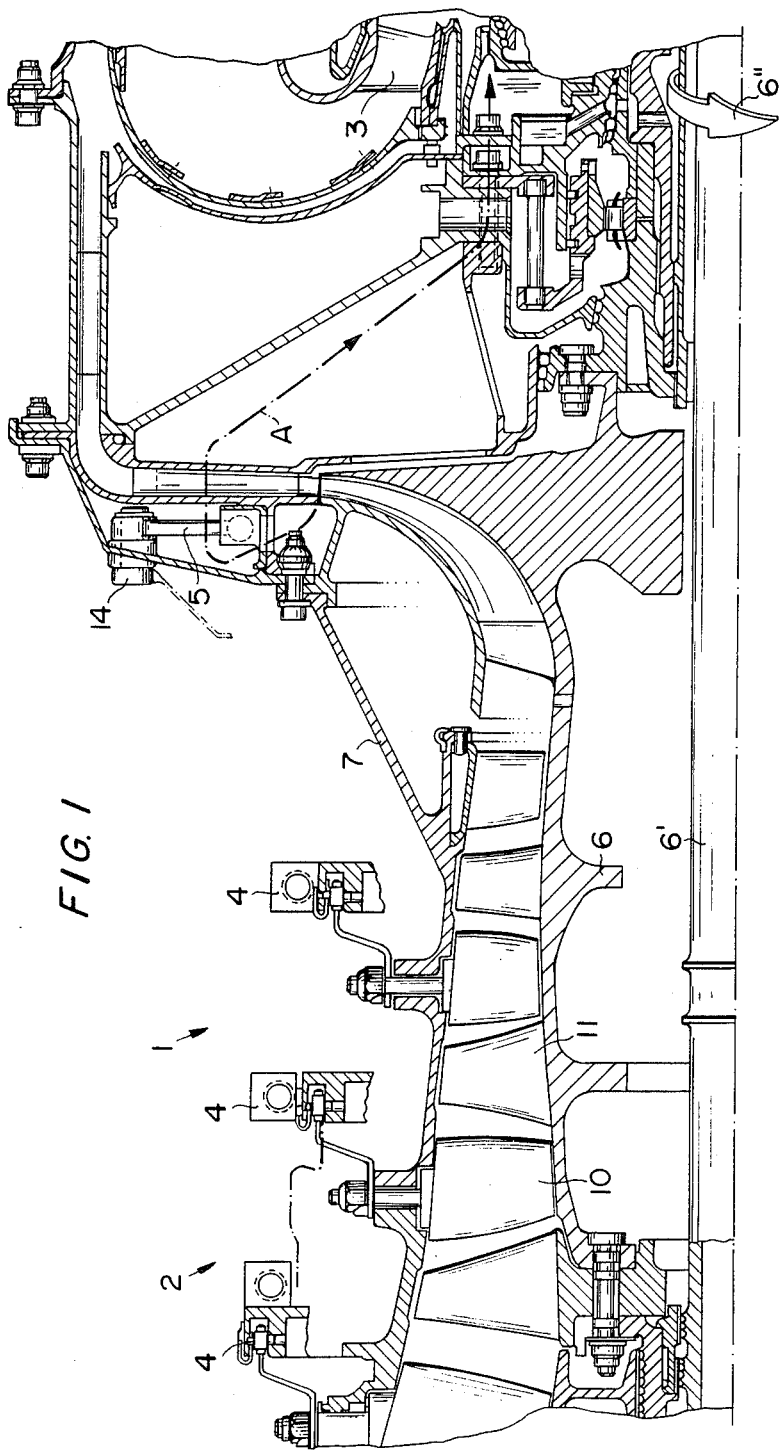
FIG. 1 is a sectional axial view through a schematic illustration of a cooled gas turbine, wherein the volume of the cooling air for the turbine is controlled in response to the adjustment control of the guide vanes or blades of the compressor arranged upstream of the turbine as viewed in the flow direction.

The cooled gas turbine power plant 1 partially shown in FIG. 1 comprises a compressor 2 arranged upstream of a high pressure turbine 3. The rotor 6 carrying rotor blades 11 is conventionally mounted on a shaft 6' rotating in the direction of the arrow 6". The stator of the compressor sections has a housing 7 in which the stator guide blades 10 are conventionally mounted for adjustment by first control members 4. The first control members 4 control the operation of the compressor section 2 by adjusting the stagger angle of at least several of the guide vanes or blades 10. The cooling air flow from the outlet end of the compressor section 2 into the inlet end of the turbine section 3 is indicated by the dash-dotted arrow A. More specifically, the cooling air travels from the take-out location just downstream of the impeller of the radial end stage of the compressor section 2 to the initial whirl or preforming nozzle of the first stage of the high pressure turbine section 3.

The second control means which are, according to the invention, responsive to the operation of the first control members 4 comprise a volume control member 5 in the form of a rotary slide valve which is mechanically or rigidly coupled to the control members 4 of the compressor section 2 as will be described with reference to FIG. 2.

As shown in FIG. 2 the quantity of the cooling air A is controlled by the rotary slide valve 5 mounted in the turbine housing in a conventional manner. The slide valve 5 has a detent 14 connected to a coupling linkage 8 comprising a double arm rocker lever 9 journalled at 7' to the compressor housing 7. The double arm lever 9 forms a rocking lever with a first arm 9' pivotally connected to a piston rod 15' of a piston cylinder device 15 forming one of the first control members 4. The piston rod 15' is further conventionally connected or linked through respective pivoting or journal means to one of the guide vanes or blades 10 as shown in the lower left-hand part of FIG. 2. Additionally, the first lever arm 9' is also pivotally connected to further guide vanes or blades 10 as schematically shown in FIG. 2. The second lever arm 9" is pivoted at its free end 12' to an actuating rod 12 for the slide valve member 5. The actuating rod 12 has a forked upper end journalled to a detent 14 of the slide valve member 5. Thus, the operation of the valve member 5 is rigidly linked to the adjustment control of the guide vanes 10 of the compressor section 2.

Details of the linking and journal means just described are not shown in FIG. 2 for simplicity's sake and because such details as tie bars, excentric bushings, and the like, are well known in the art.

FIG. 3 illustrates the ratio $\dot{m}_K/\dot{m}_{ges}$ as a function of the turbine entry temperature $T_{41}$ in degrees Kelvin. The curve or graph of FIG. 3 has been measured in connection with a practical embodiment of the invention, whereby the total cooling air consumption was about 3%. 2% of cooling air were used in the first stage of the turbine section 3 and 1% was used in the second stage of the turbine section 3.

The first control member 4 according to FIG. 2 incorporates a piston 50 which is axially displaceable within the piston cylinder device 15. The piston 50 is fixedly joined to the aforementioned piston rod 15'. The first control member 4 can be operated e.g. pneumatically or hydraulically.

For the operation of the first control member 4 a fluid, e.g. oil from the engine oil system is fed into the piston cylinder device 15, thus leading to the desired axial displacement of the piston 50 with respect to the desired adjustment of the guide vanes/blades 10 respectively. A control member as being described as said "first control member" is known per se from the U.S. Pat. No. 3,869,221 in connection with a fan blade adjusting apparatus (FIG. 1, reference numbers 8,10).

Figure 4:
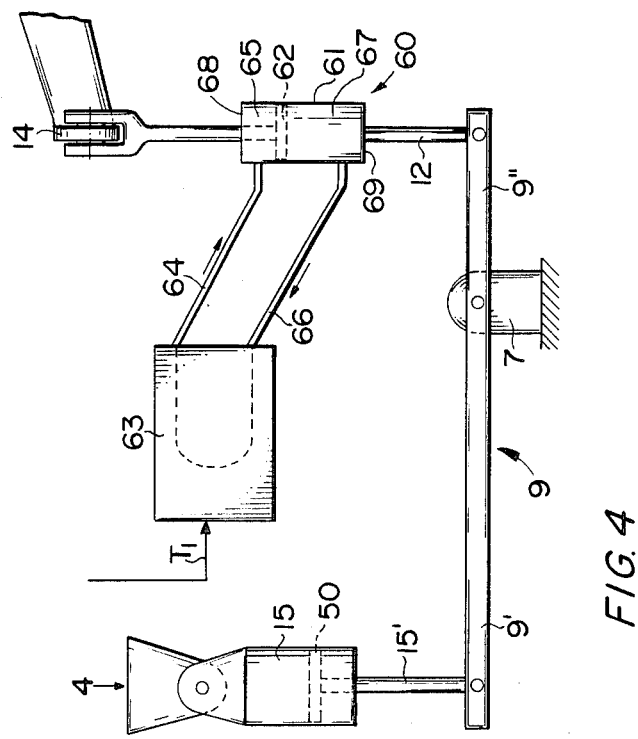
FIG. 4 is a schematic illustration of the means employed for adjusting the zero point in the response characteristic of the cooling air volume control member.

FIG. 4 incorporates a temperature responsive control correction member 60 with a cylinder member 61 and a piston 62 which is axially displaceable within the cylinder member 61. An engine control system 63 is connected via a first conduit 64 with a first cylinder chamber 65 and further via a second conduit 66 with a second cylinder chamber 67. The first cylinder chamber 65 is defined between one wall area of the piston 62 and a first covering wall 68 of said cylinder member 61. The second cylinder chamber 67 is defined between the other wall area of the piston 62 and a second covering wall 69 of said cylinder member 61. Conduit 66 serves as a feed-back line from said second cylinder chamber 67 to the control system 63 (see: dotted line therin).

Further there is a temperature sensing means (not shown) sensing the inlet temperature $T_1$ of the engine compressor. During the operation of the engine the engine control system 63 acts in response to the measured inlet temperature $T_1$ (signal), thus providing a corresponding flow of oil into conduit 64. So far FIG. 4 requires the same or quite similar means as being disclosed in FIG. 2 those means are incorporated into FIG. 4 as follows: First control member 4, piston cylinder device 15, piston 50, piston rod 15', double arm lever 9, first arm 9', second arm 9", compressor housing 7, actuating rod 12, which—in FIG. 4—is fixedly joined to the second covering wall 69 of the cylinder member 61. Further—contrary to FIG. 2—FIG. 4 incorporates a piston rod 68 of said piston 62, said piston rod 68 extending axially upwards from the control correction member 60 and being axially displaceable with the forked upper end 13 journalled to the detent 14 of the slide valve member 5.

Figure 5:
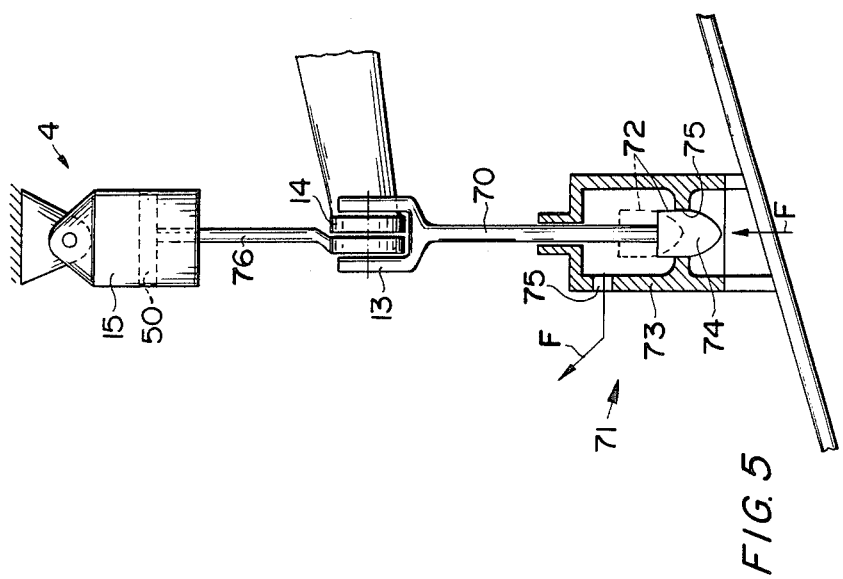
FIG. 5 is a schematic illustration of the compressor control in response to its discharge air volume.

FIG. 5 includes the first control member 4 incorporating the piston cylinder device 15, the piston 50 being axially displaceable in the cylinder device 15. Further there is a rod means 70 of a compressor air bleeding valve 71. The rod means 70 is fixedly joined to a valve body 72. The valve body 72 is axially displaceable in a cylinder member 73. The valve body includes an end section 74 which is tapered against the existing air flow F from the compressor of the engine. The valve 71 comprises a bore 75 in a seat plate of the cylinder member 73. The bore 75 in the seat plate can be opened (see: dotted line position of the end section 74), thus leading the compressor bleeding air flow F through the cylinder member 73 and into a further bore 75. In this way a portion of the compressed air from compressor will be bled off from said bore 75 via a conduit (not shown) to atmosphere for example.

In FIG. 5 the actuating rod means 70 has the forked upper end 13, the said upper end 13 being journalled to the detent 14 of the slide valve member 5 (see: FIG. 2)

on the hand and to a downwards pointing end of a further rod 76, which is fixedly joined to the piston 50 in the cylinder device 15 of the first control member 4.

The indicated dotted line or open position of valve 71 represents the so called "low partial load operating position". The other or closed position of the valve body 72 represents the so called "high partial load operating position".

What I claim is:

1. A cooled gas turbine power plant, comprising compressor means for providing a compressed gas flow, a high pressure turbine operatively connected to said compressor means downstream of said compressor means as viewed in the gas flow direction, first control means for controlling said compressor means, second control means for controlling the quantity of cooling air to be supplied to said high pressure turbine, and mechanical means for directly and mechanically coupling said second control means to said first control means for controlling the cooling air directly taken out of said compressor means for supplying the cooling air to said high pressure turbine in response to an operation of said first control means, said first and second control means cooperating for causing the quantity of cooling air supplied from said compressor means to said high pressure turbine means to be proportional to the instantaneous load conditions.

2. The cooled gas turbine power plant of claim 1, wherein said second control means for controlling the quantity of cooling air comprise rotary slide valve means operatively interposed between a cooling air take-off point at said compressor means and a cooling air inlet of said high pressure turbine, and wherein said mechanical coupling means comprise a coupling linkage connecting said rotary slide valve means to said first control means for operating said rotary slide valve means in synchronism with said first control means.

3. The cooled gas turbine power plant of claim 2, wherein said compressor means comprise a compressor housing, and wherein said mechanical coupling means further comprise journal means for pivoting said coupling linkage to said compressor housing.

4. The cooled gas turbine power plant of claim 2, wherein said compressor means comprise controllable guide blades and means connecting said controllable guide blades to said first control means, said coupling linkage means comprising a rocker lever including a first lever arm and a second lever arm, means connecting said first lever arm to said first control means and to at least several of said controllable guide blades for continuously adjusting a stagger angle in a certain r.p.m. range of said compressor means and in response to the compressor r.p.m., and an adjustment rod connecting said second lever arm to said rotary slide valve means for adjusting said rotary slide valve means in response to said stagger angle.

5. The cooled gas turbine power plant of claim 4, wherein said adjustment rod has a forked end, and wherein said rotary slide valve means has a detent journalled to said forked end for adjusting said rotary slide valve.

6. The cooled gas turbine power plant of claim 1, wherein said second control means comprise a temperature responsive control correction member, means for sensing a temperature at an inlet of said compressor means connected to said temperature responsive control correction member for adjusting said rotary slide valve means in the sense of a zero point displacement of a valve characteristic of said rotary slide valve means.

7. The cooled gas turbine power plant of claim 6, wherein said second control means are controlled in response to an adjusted angular position of guide blades of said compressor means.

8. The cooled gas turbine power plant of claim 6, wherein said second control means are controlled in response to a discharge air quantity of said compressor means.

* * * * *